(12) United States Patent
Nguyen et al.

(10) Patent No.: US 7,231,510 B1
(45) Date of Patent: Jun. 12, 2007

(54) PIPELINED MULTIPLY-ACCUMULATE UNIT AND OUT-OF-ORDER COMPLETION LOGIC FOR A SUPERSCALAR DIGITAL SIGNAL PROCESSOR AND METHOD OF OPERATION THEREOF

(75) Inventors: Hung T. Nguyen, Plano, TX (US); Shannon A. Wichman, McKinney, TX (US)

(73) Assignee: VeriSilicon Holdings (Cayman Islands) Co. Ltd., Santa Clara, CA (US)

( * ) Notice: Subject to any disclaimer, the term of this patent is extended or adjusted under 35 U.S.C. 154(b) by 479 days.

(21) Appl. No.: 10/007,498

(22) Filed: Nov. 13, 2001

(51) Int. Cl.
*G06F 7/483* (2006.01)

(52) U.S. Cl. .................. 712/218; 712/215; 712/219; 712/217; 712/221; 708/523

(58) Field of Classification Search ........ 712/214–219, 712/221; 708/501, 523
See application file for complete search history.

(56) References Cited

U.S. PATENT DOCUMENTS

| | | | | |
|---|---|---|---|---|
| 3,569,939 A | * | 3/1971 | Doblmaier et al. ......... | 712/224 |
| 4,683,547 A | * | 7/1987 | DeGroot .................... | 708/507 |
| 5,826,055 A | * | 10/1998 | Wang et al. ................ | 712/218 |
| 6,112,019 A | * | 8/2000 | Chamdani et al. .......... | 712/214 |

OTHER PUBLICATIONS

Motorola, MPC7410 RISC Microprocessor Technical Summary, 2000, pp. 2-11, 20-21, 31-33, 36.*
Morris, John, Computer Architecture The Anatomy of Modern Processors, 1998, http://ciips.ee.uwa.edu.au/~morris/CA406/pipelines.html.*
LSI Logic Corporation, An Overview of the ZSP Architecture White Paper, 2000.*
Ruetz, Peter and Wen-Wi Ti, Interleaved Multiplier Accumulator, Sep. 12, 1992, European Patent Application.*

* cited by examiner

*Primary Examiner*—Donald Sparks
*Assistant Examiner*—Tonia L Meonske

(57) ABSTRACT

A mechanism for, and method of, processing multiply-accumulate instructions with out-of-order completion in a pipeline, for use in a processor having an at least four-wide instruction issue architecture, and a digital signal processor (DSP) incorporating the mechanism or the method. In one embodiment, the mechanism including: (1) a multiply-accumulate unit (MAC) having an initial multiply stage and a subsequent accumulate stage and (2) out-of-order completion logic, associated with the MAC, that causes interim results produced by the multiply stage to be stored when the accumulate stage is unavailable and allows younger instructions to complete before the multiply-accumulate instructions.

17 Claims, 5 Drawing Sheets

PRIOR ART

PIPELINED MULTIPLY-ACCUMULATE UNIT AND OUT-OF-ORDER COMPLETION LOGIC FOR A SUPERSCALAR DIGITAL SIGNAL PROCESSOR AND METHOD OF OPERATION THEREOF

TECHNICAL FIELD OF THE INVENTION

The present invention is directed, in general, to digital signal processors (DSPs) and, more specifically, to a pipelined multiply-accumulate unit (MAC) and out-of-order completion logic for a superscalar DSP and method of operating the same.

BACKGROUND OF THE INVENTION

Over the last several years, DSPs have become an important tool, particularly in the real-time modification of signal streams. They have found use in all manner of electronic devices and will continue to grow in power and popularity.

As time has passed, greater performance has been demanded of DSPs. In most cases, performance increases are realized by increases in speed. One approach to improve DSP performance is to increase the rate of the clock that drives the DSP. As the clock rate increases, however, the DSP's power consumption and temperature also increase. Increased power consumption is expensive, and intolerable in battery-powered applications. Further, high circuit temperatures may damage the DSP. The DSP clock rate may not increase beyond a threshold physical speed at which signals may traverse the DSP. Simply stated, there is a practical maximum to the clock rate that is acceptable to conventional DSPs.

An alternate approach to improve DSP performance is to increase the number of instructions executed per clock cycle by the DSP ("DSP throughput"). One technique for increasing DSP throughput is pipelining, which calls for the DSP to be divided into separate processing stages (collectively termed a "pipeline"). Instructions are processed in an "assembly line" fashion in the processing stages. Each processing stage is optimized to perform a particular processing function, thereby causing the DSP as a whole to become faster.

"Superpipelining" extends the pipelining concept further by allowing the simultaneous processing of multiple instructions in the pipeline. Consider, as an example, a DSP in which each instruction executes in six stages, each stage requiring a single clock cycle to perform its function. Six separate instructions can therefore be processed concurrently in the pipeline; i.e., the processing of one instruction is completed during each clock cycle. The instruction throughput of an n-stage pipelined architecture is therefore, in theory, n times greater than the throughput of a non-pipelined architecture capable of completing only one instruction every n clock cycles.

Another technique for increasing overall DSP speed is "superscalar" processing. Superscalar processing calls for multiple instructions to be issued ("wide-issue") and processed per clock cycle. Assuming that instructions are independent of one another (the execution of each instruction does not depend upon the execution of any other instruction), DSP throughput is increased in proportion to the number of instructions processed per clock cycle ("degree of scalability"). If, for example, a particular DSP architecture is superscalar to degree three (i.e., three instructions are processed during each clock cycle), the instruction throughput of the DSP is theoretically tripled.

These techniques are not mutually exclusive; DSPs may be both superpipelined and superscalar. However, operation of such DSPs in practice is often far from ideal, as instructions tend to depend upon one another and are also often not executed efficiently within the pipeline stages. In actual operation, instructions often require varying amounts of DSP resources, creating interruptions ("bubbles" or "stalls") in the flow of instructions through the pipeline. Consequently, while superpipelining and superscalar techniques do increase throughput, the actual throughput of the DSP ultimately depends upon the particular instructions processed during a given period of time and the particular implementation of the DSP's architecture.

One of the resources often found in DSPs, and processors in general for that matter, is a MAC. MACs are responsible for executing instructions that call for multiplication and division operations to be performed. Multiplication and division operations are important functions for DSPs to perform efficiently. Unfortunately, conventional MACs consume a significant amount of time to operate.

As DSP clock speed has continued to increase, MACs have had a difficult time keeping up. As complicated as MACs are, it remains highly desirable to confine their operation to one clock cycle, so as not to introduce bubbles into the pipeline. What is needed in the art is a new MAC architecture for pipelined processors. More specifically, what is needed is a new MAC architecture for pipelined DSPs. And still more specifically, what is needed is a new MAC architecture and associated logic that allow the MAC to operate in the environment of a wide-issue, pipelined DSP.

SUMMARY OF THE INVENTION

To address the above-discussed deficiencies of the prior art, the present invention provides, for use in a processor having an at least four-wide instruction issue architecture, a mechanism for, and method of, pipeline processing multiply-accumulate instructions with out-of-order completion and a digital signal processor incorporating the mechanism or the method. In one embodiment, the mechanism includes: (1) a MAC having an initial multiply stage and a subsequent accumulate stage and (2) out-of-order completion logic, associated with the MAC, that causes interim results produced by the multiply stage to be stored when the accumulate stage is unavailable and allows younger instructions access to complete before the multiply-accumulate instructions. "Younger instructions" are simply instructions that follow "older instructions."

The present invention therefore introduces the broad concept of pipelining a MAC and employing logic to support out-of-order completion to allow the MAC to operate at a higher throughput than was previously possible. The out-of-order completion logic preferably does not require temporary storage for other, non-MAC instructions. Further, the MAC preferably appears to be an in-order completion machine, rendering its out-of-order capability transparent to the rest of the DSP or a programmer.

In one embodiment of the present invention, the initial multiply stage and the subsequent accumulate stage are single clock cycle stages. In an embodiment to be illustrated and described, the MAC appears to produce a final result every clock cycle, which makes the MAC as fast as a pipeline stage.

In one embodiment of the present invention, the out-of-order completion logic is contained in a writeback stage of a pipeline in the processor. In a related embodiment, the out-of-order completion logic detects the order of instructions and writes back the interim results to at least one register in the MAC before the multiply-accumulate instructions arrive at the accumulation stage of the MAC.

In one embodiment of the present invention, the interim results are unavailable to an external program executing in the processor. Though not necessary to the present invention, the mechanism is advantageously invisible to external programs.

In one embodiment of the present invention, grouping logic within the processor groups the multiply-accumulate instructions based on the mechanism. Though not required, multiply-accumulate instructions are advantageously grouped to take out-of-order completion into account. Exemplary rules to effect such grouping will be set forth in the Detailed Description that follows.

In one embodiment of the present invention, the processor is a digital signal processor. Those skilled in the pertinent art will understand, however, that the principles of the present invention can find application in processors of many types, including non-DSP, general purpose microprocessors.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
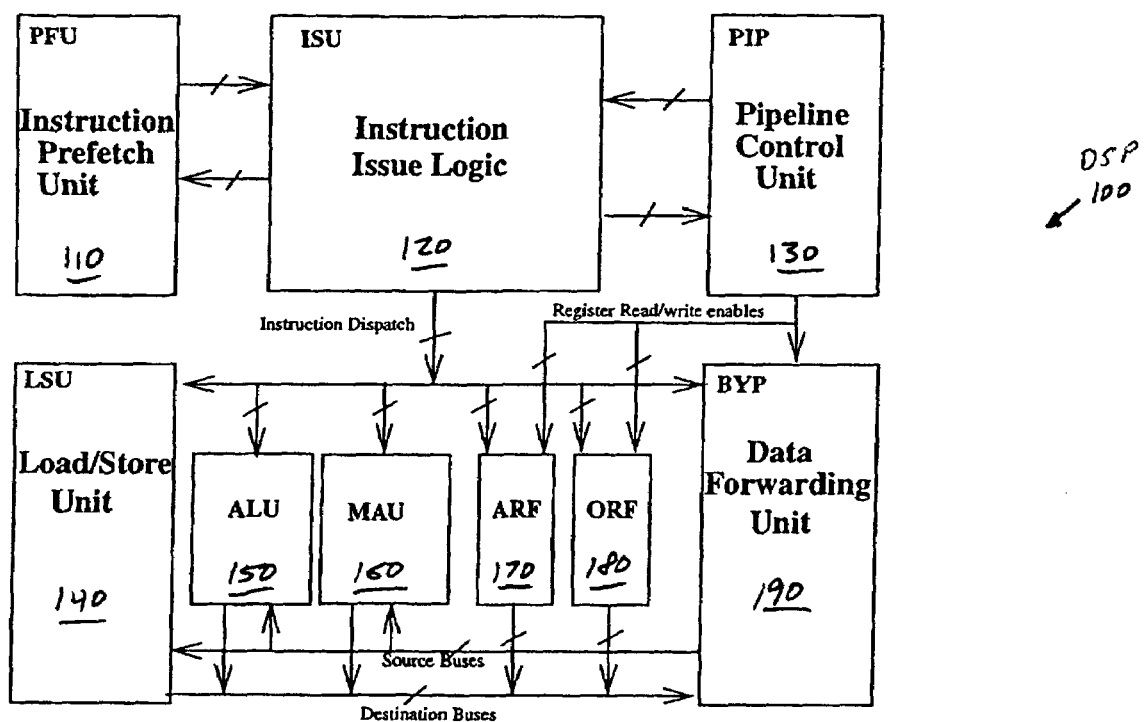
FIG. 1 illustrates an exemplary DSP which may form an environment within which a pipelined MAC and out-of-order completion logic constructed according to the principles of the present invention can operate.

Referring initially to FIG. 1, illustrated is an exemplary DSP, generally designated 100, which may form an environment within which a pipelined MAC and out-of-order completion logic constructed according to the principles of the present invention can operate. Those skilled in the pertinent art should understand that the pipelined MAC and out-of-order completion logic of the present invention may be applied to advantage in other conventional or later-discovered DSP or general-purpose, non-DSP, processor architectures.

The DSP 100 contains an instruction prefetch unit (PFU) 110. The PFU 110 is responsible for anticipating (sometimes guessing) and prefetching from memory the instructions that the DSP 100 will need to execute in the future. The PFU 110 allows the DSP 100 to operate faster, because fetching instructions from memory involves some delay. If the fetching can be done ahead of time and while the DSP 100 is executing other instructions, that delay does not prejudice the speed of the DSP 100.

The DSP 100 further contains instruction issue logic (ISU) 120. The ISU 120 is responsible for the general task of instruction "issuance," which involves decoding instructions, determining what processing resources of the DSP 100 are required to execute the instructions, determining to what extent the instructions depend upon one another, queuing the instructions for execution by the appropriate resources (e.g., arithmetic logic unit, MAC and address and operand register files) and retiring instructions after they have been executed or are otherwise no longer of use. Accordingly, the ISU 120 cooperates with the PFU 110 to receive prefetched instructions for issuance. The ISU 120 is, in the illustrated embodiment of the present invention, an advantageous place to locate some of the out-of-order completion logic that effects out-of-order completion with a pipelined MAC. More specifically, grouping rules attuned to the architecture of the MAC and designed to avoid hazards potentially presented by that architecture may be embodied in grouping logic within the ISU 120.

In a normal operating environment, the DSP 100 processes a stream of data (such as voice, audio or video), often in real-time. The DSP 100 is adapted to receive the data stream into a pipeline (detailed in Table 1 below and comprising eight stages). The pipeline is under control of a pipeline control unit (PIP) 130. The PIP 130 is responsible for moving the data stream through the pipeline and for ensuring that the data stream is operated on properly. Accordingly, the PIP 130 coordinates with the ISU 120 to ensure that the issuance of instructions is synchronized with the operation of the pipeline, that data serving as operands for the instructions are loaded and stored in proper place and that the necessary processing resources are available when required.

TABLE 1

| Pipeline Stages | |
|---|---|
| Stage | Employed to |
| Fetch/Decode (F/D) | fetch and decode instructions |
| Group (GR) | check grouping and dependency rules group valid instructions execute return instructions |
| Read (RD) | read operands for address generation and control register update dispatch valid instructions to all functional units execute move immediate to control register instructions |
| Address Generation (AG) | calculate addresses for all loads and stores execute bit operations on control registers |

TABLE 1-continued

Pipeline Stages

| Stage | Employed to |
|---|---|
| Memory Read 0 (M0) | send registered address and request to the memory subsystem. |
| Memory Read 1 (M1) | load data from the memory subsystem register return data in the ORF (term defined below) read operands for execution from the ORF. |
| Execute (EX) | execute remaining instructions write results to the ORF or send results to BYP (term defined below) execute the multiply phase of MAC instructions |
| Writeback (WB) | register results in the ORF or the ARF (term defined below) execute the accumulate phase of MAC instructions |

A load/store unit (LSU) 140 is coupled to, and under the control of, the PIP 130. The LSU 140 is responsible for retrieving the data that serves as operands for the instructions from memory (a process called "loading") and saving that data back to the memory as appropriate (a process called "storing"). Accordingly, though FIG. 1 does not show such, the LSU 140 is coupled to a data memory unit, which manages data memory to load and store data as directed by the LSU 140. The DSP 100 may be capable of supporting self-modifying code (code that changes during its own execution). If so, the LSU 140 is also responsible for loading and storing instructions making up that code as though the instructions were data.

As mentioned above, the DSP 100 contains various processing resources that can be brought to bear in the execution of instructions and the modification of the data in the data stream. An arithmetic logic unit (ALU) 150 performs general mathematical and logical operations (such as addition, subtraction, shifting, rotating and Boolean operations) and is coupled to, and under control of, both the ISU 120 and the PIP 130. A MAC and another ALU are provided in a MAC/accumulate unit (MAU) 160 to perform multiplication and division calculations and calculations that are substantially based on multiplication or division and, as the ALU 150, is coupled to, and under control of, both the ISU 120 and the PIP 130.

The DSP 100 contains very fast, but small, memory units used to hold information needed by instructions executing in the various stages of the pipeline. That memory is divided into individually designated locations called "registers." Because the various stages of the pipeline employ the registers in their instruction-processing, the registers are directly accessible by the stages. The DSP 100 specifically contains an address register file (ARF) 170 and an operand register file (ORF) 180. As the names imply, the ARF 170 holds addresses (typically corresponding to memory locations containing data used by the stages) and the ORF 180 holds operands (data that can be directly used without having to retrieve it from further memory locations).

Certain data may be required for more than one instruction. For example, the results of one calculation may be critical to a later calculation. Accordingly, a data forwarding unit (BYP) 190 ensures that results of earlier data processing in the pipeline are available for subsequent processing without unnecessary delay.

Though not illustrated in FIG. 1, the DSP 100 has an overall memory architecture that 100 is typical of conventional DSPs and microprocessors. That is, its registers are fast but small; its instruction and date caches (contained respectively in the PFU 110 and the LSU 140) are larger, but still inadequate to hold more than a handful of instructions or data; its local instruction memory and data memory 122 are larger still, but may be inadequate to hold an entire program or all of its data. An external memory (not located within the DSP 100 itself) is employed to hold any excess instructions or data.

It should be noted in this context that the illustrated DSP 100 is of a Harvard architecture. Its instruction and data memories are separate, controlled by separate controllers and separately addressed by the PFU 110 and the LSU 140, respectively. Those skilled in the pertinent art should understand, however, that the principles of the present invention are as easily applied to a von Neumann architecture (one in which instruction and data memories are merged into a single logical entity).

Figure 2:
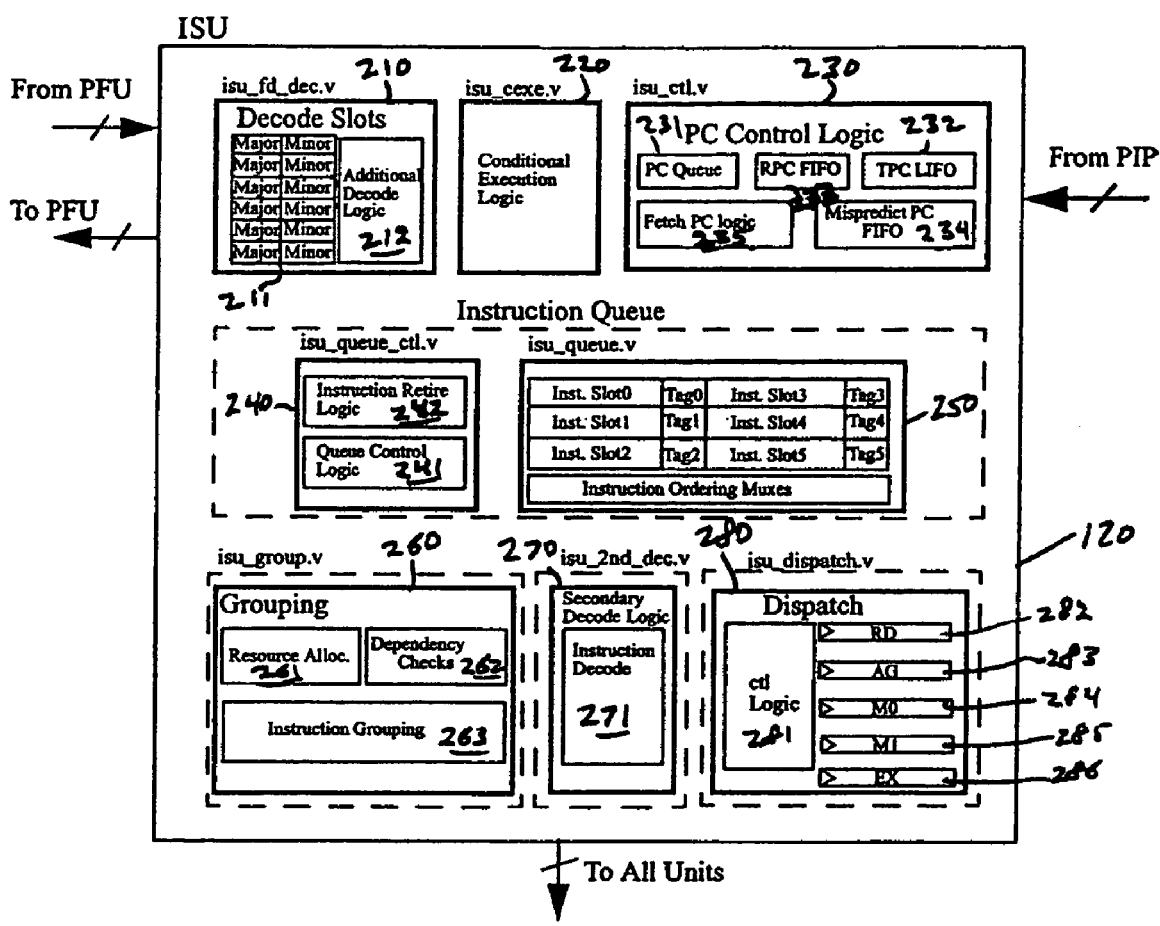
FIG. 2 illustrates in greater detail an instruction issue unit of the DSP of FIG. 1.

Turning now to FIG. 2, illustrated in greater detail is the ISU 120 of FIG. 1. Recall that the ISU 120 is responsible for the general task of instruction "issuance," which involves decoding instructions, determining what processing resources of the DSP 100 are required to execute the instructions, determining to what extent the instructions depend upon one another, queuing the instructions for execution by the appropriate resources (e.g., the ALU 150, the MAU 160, the ARF 170 and the ORF 180) and retiring instructions after they have been executed, invalidated or are otherwise no longer of use.

The illustrated ISU 120 is capable of decoding and issuing up to six instructions in order. To perform this function, the ISU 120 receives partially decoded instructions from an instruction queue within the PFU 110 of FIG. 1 and communicates with the F/D, GR, RD, AG, M0 and M1 stages of the pipeline to issue the instructions as appropriate.

The ISU 120 contains an instruction decode block isu_fd_dec 210; a conditional execution logic block isu_cexe 220; a program counter (PC) controller isu_ctl 230; an instruction queue (containing an instruction queue control block isu_queue_ctl 240 and an instruction queue block isu_queue 250); an instruction grouping block isu_group 260; a secondary control logic block isu_2nd_dec 270; and a dispatch logic block isu_dispatch 280.

The PFU 110 sends up to six partially-decoded and aligned instructions to isu_fd_dec 210. These instructions are stored in a six slot queue 211. Each slot in the queue 211 consists of major and minor opcode decoders and additional decode logic 212. The instructions are fully decoded in the F/D stage of the pipeline. The instructions in the queue 211 are only replaced (retired) from the queue 211 after having been successfully grouped in the GR stage.

The contents of the queue 211 are sent to grouping logic in the GR stage of the pipeline for hazard detection. Instruction grouping logic 263 within isu_group 260 governs the GR stage. The instruction grouping logic 263 embodies a predefined set of rules, implemented in hardware, that determines which instructions can be grouped together for execution in the same clock cycle. The instruction grouping logic 263 includes logic 262 devoted to performing dependency checks, e.g., write-after-write (WAW), read-after-write (RAW) and write-after-read (WAR). Certain grouping rules designed to accommodate the pipelined MAC of the present invention will be presented in detail in Table 2, below.

The grouping process is important to the operation and overall performance of the DSP 100, because instruction opcodes, instruction valid signals, operand register reads and relevant signals are dispatched to appropriate functional units in subsequent pipeline stages based upon its outcome. Resource allocation logic 261 assists in the dispatch of this information.

The conditional execution logic block isu_cexe 220 is responsible for identifying conditional execution (cexe) instructions and tagging the beginning and ending instructions of the cexe blocks that they define in the queue 211. When instructions in a cexe block are provided to the GR stage, they are specially tagged to ensure that the instruction grouping logic 263 groups them for optimal execution.

The PC controller isu_ctl 230 includes a PC register, a trap PC (TPC) register, activated when an interrupt is asserted, and a return PC (RPC) register, activated when a call occurs. These registers have associated queues: a PC queue 231, a TPC last-in, first-out queue 232 and an RPC first-in, first-out queue 233. isu_ctl 230 also contains logic to update these registers and queues 231, 232, 233. A mispredict PC register, a mispredict first-in, first-out queue 234 and associated logic keep track of mispredictions. Fetch PC logic 235 controls the prefetching of instructions and, accordingly, the PFU 110 of FIG. 1. Subsequent PCS are calculated based on the number of the instructions grouped in the GR stage and the current state of the DSP 100. The state of the DSP 100 is affected by interrupts, branch mispredictions and return instructions.

The instruction queue (containing isu_queue_ctl 240 and isu_queue 250) actually contains the instructions which are queued for dispatch to the pipeline. The queue itself, isu_queue 250, has six 91-bit entries and input and output multiplexers (not shown). isu_queue 250 has a variable depth that depends upon the number of instructions grouped therein. isu_queue_ctl 240 contains all isu_queue 250 control logic 241 and instruction retire logic 242. For the purpose of saving power, this instruction retire logic 242 checks for "tight loops." A "tight loop" is defined as a loop that has a maximum of six instructions. A tight loop can and should continue to reside within isu_queue 250 until it has been executed for the last time. This saves power and time by foregoing repeated reloading of the tight loop. As instructions are retired from isu_queue 250, newly decoded instructions in the queue 211 can be written to its empty slots.

The secondary control logic block isu_2nd_dec 270 provides additional instruction decode logic 271 for the GR, RD, M0 and M1 stages of the pipeline. The main function of the additional instruction decode logic 271 is to provide additional information from each instruction's opcode to isu_group 260. The instruction decoders in isu_2nd_dec 270 are the same as those employed in the additional decode logic 212 of isu_fd_dec 210.

Finally, the dispatch logic block isu_dispatch 280 includes control logic 281, five native opcode staging registers 282, 283, 284, 285, 286 (corresponding to the RD, AG, M0, M1 and EX stages of the pipeline) and logic (not shown) to generate instruction valid signals. isu_dispatch 280 also transmits register addresses for source and destination registers and read enable signals to the BYP 190, the ORF 180, and the ARF 170. Among other things, the control logic 281 uses grouping information and a branch mispredict signal to determine when the staging registers 282, 283, 284, 285, 286 require updating.

Figure 3:
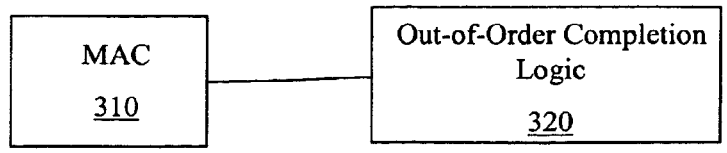
FIG. 3 illustrates a mechanism for pipeline processing multiply-accumulate instructions with out-of-order completion.

Turning now to FIG. 3, illustrated is a mechanism, generally designated 300, for pipeline processing multiply-accumulate instructions with out-of-order completion. The mechanism 300 is illustrated as including a MAC 310. The MAC 310 is located within the MAU 160 of FIG. 1 and has an initial multiply stage and a subsequent accumulate stage (not shown in FIG. 3, but shown in detail in FIG. 4). Each stage of the MAC is designed to be operated independently. Each stage can be allocated at different times to the execution of different instructions. The stages can also be allocated to execute a single instruction sequentially.

The mechanism is further illustrated as including out-of-order completion logic 320. The out-of-order completion logic 320 is generally associated with the MAC 310, but, in terms of the DSP 100 illustrated in FIGS. 1 and 2, is physically divided between the ISU 120 and the WB stage of the pipeline.

The portions of the out-of-order completion logic 320 located in the ISU 120 are devoted to grouping MAC instructions appropriately. The portions are, in the illustrated embodiment, contained in grouping rules embodied in hardware within the instruction grouping logic 263 of isu_group 260 of FIG. 2. The specific grouping rules applicable to the illustrated embodiment are as set forth in Table 2, below.

TABLE 2

Grouping Rules

Rule 1:

When reading from guard registers (g0, g1, g2, g3, g4, g5, g6 and g7), do not group any of the following instructions that read or write to a guard register:
mov rX, %guard (RAW hazard)
bitc %guard, x (RAW hazard)
bits %guard, x (RAW hazard)
biti %guard, x (RAW hazard)
40-bit ALU operations that read a guard register (RAW hazard)
mov %guard, rX/IMM (WAR and WAW hazard)
pop instruction that updates all guard registers (WAR and WAW hazard)
MAC instructions (mac.a, mac.b, macn.a, macn.b, mac2.a, mac2.b, cmacr.a, cmacr.b, cmaci.a, cmaci.b, dmac.a, dmac.b and quad-mac) in the GR or RD stages of the pipeline.

Rule 2:

Never group an instruction that depends on the results of an older instruction, with the following exceptions:
the younger instruction is a store or push operation, and the older instruction is not a MAC instruction (mac.a, mac.b, macn.a, macn.b, mul.a, mul.b, muln.a, muln.b, mac2.a, mac2.b, cmacr.a, cmacr.b, cmaci.a, cmaci.b, cmulr.a, cmulr.b, cmuli.a, cmuli.b, dmac.a, dmac.b, dmul.a, dmul.b, imul.a, imul.b and quad-mac).
the younger instruction is a multiply-accumulate operation and the older instruction is updating the accumulator.

Rule 3:

Never group an instruction that depends on the result of an older MAC instruction (mac.a, mac.b, macn.a, macn.b, mul.a, mul.b, muln.a, muln.b, mac2.a, mac2.b, cmacr.a, cmacr.b, cmaci.a, cmaci.b, cmulr.a, cmulr.b, cmuli.a, dmac.a, dmac.b, dmul.a, dmul.b, imul.a, imul.b and quad-mac) that is in the GR or RD stages of the pipeline.

Rule 4:

Never group an AGU (LSU) instruction that depends on the results of an older MAC instruction (mac.a, mac.b, macn.a, macn.b, mul.a, mul.b, muln.a, muln.b, mac2.a, mac2.b, cmacr.a, cmacr.b, cmaci.a, cmaci.b, cmulr.a, cmulr.b, cmuli.a, cmuli.b, dmac.a, dmac.b, dmul.a, dmul.b, imul.a, imul.b and quad-mac) and the older MAC instruction is in the GR, RD, AG, M0 or M1 stages of the pipeline.

In addition to the grouping rules, the ISU 120 contains hardware to allow the two stages of the MAC 310 to be allocated independently. This hardware is incorporated into the queue control logic 241 of isu_queue_ctl 240.

As stated above, portions of the out-of-order completion logic 320 are located in the WB stage of the pipeline. These portions are devoted to writeback of interim results generated in the multiply stage of the MAC 310. In the illustrated embodiment, the interim results produced by the multiply stage of the MAC 310 are written back to one or more registers in the ORF 180. The interim results are stored in those one or more registers until the accumulate stage of the MAC 310 becomes available. At that time, out-of-order completion logic 320 associated with the queue control logic 241 of isu_queue_ctl 240 causes the accumulate stage to be allocated to the task of processing the interim results to completion.

By breaking the MAC into independent stages, the stages can be allocated independently to the execution of instructions, which can dramatically increase the overall throughput of the MAC 310. In fact, the MAC 310 of the illustrated embodiment appears to produce a final result every clock cycle, making the MAC 310 as fast as a pipeline stage and keeping the MAC 310 from being the constraint to overall DSP 100 speed.

Figure 4:
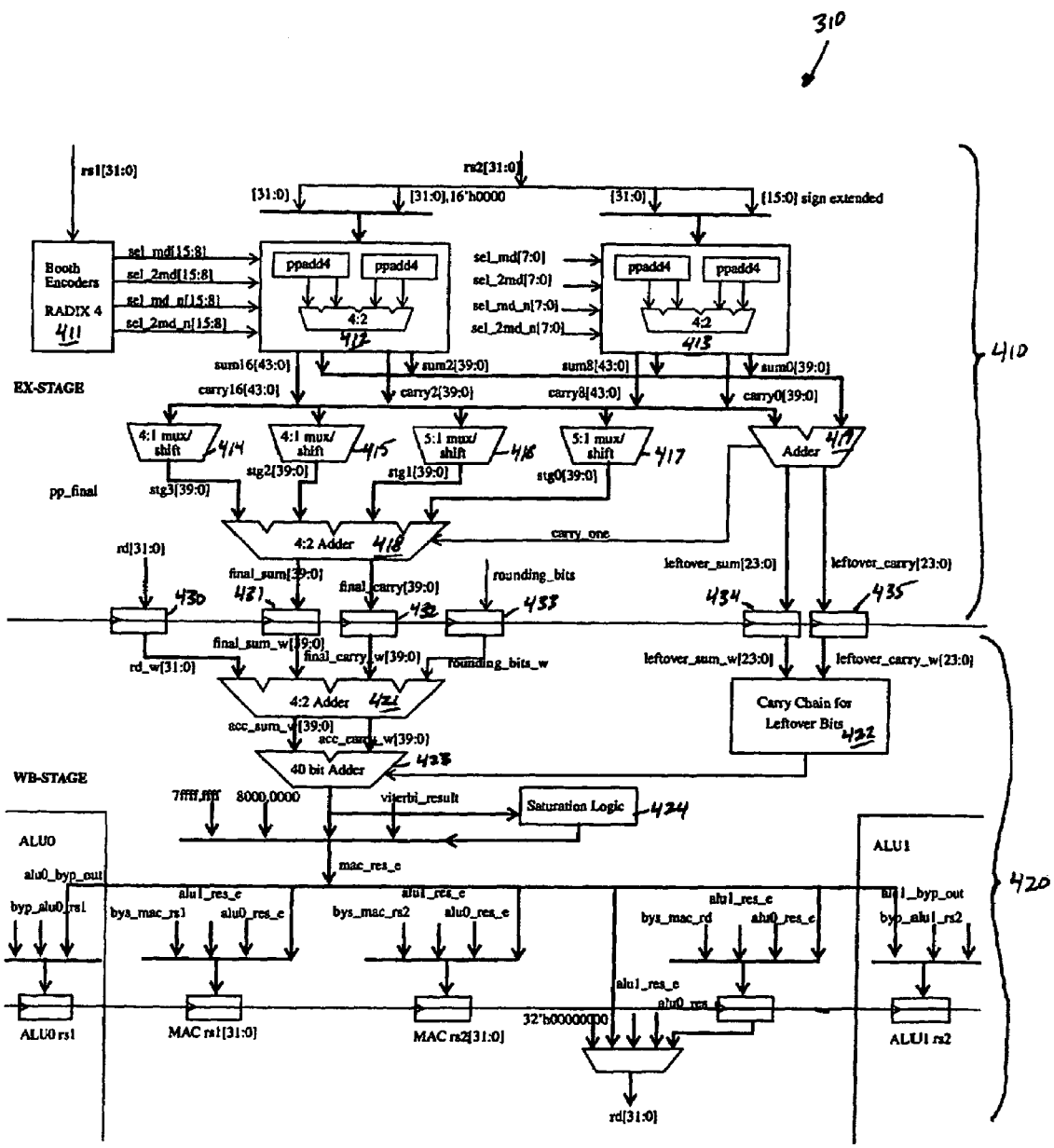
FIG. 4 illustrates a two-stage MAC constructed according to the principles of the present invention.

Turning now to FIG. 4, illustrated is a two-stage MAC 310 constructed according to the principles of the present invention.

The MAC 310 includes a multiply stage, generally designated 410, and an accumulate stage, generally designated 420. Those skilled in the art should understand that the present invention is not limited to a two-stage MAC 310 and fully encompasses MACs having three or more stages. In fact, as DSPs and processors grow in power, MACs having more than two stages may become highly advantageous.

The multiply stage 410 includes a booth encoder 411 and first and second partial product generators 412, 413. The first and second partial product generators 412, 413 provide partial products to an array of multiplexer/shifters 414, 415, 416, 417 that align the partial products with respect to one another. The aligned partial products are added in a 4:2 adder 418 to produce a final sum and carry. A leftover adder 419 produces a leftover sum and carry. Those skilled in the art will understand the specific operation of the multiply stage 410.

The final and leftover sums and carries, along with rounding bits, are provided to an array of registers 430, 431, 432, 433, 434, 435 (located in the ORF 180 of FIG. 1 in the illustrated embodiment) for temporary storage until the accumulate stage 420 becomes available.

The accumulate stage 420 comprises a 4:2 adder 421 that receives and adds the contents of the registers 430, 431, 432, 433. A carry chain 422 receives the leftover sum and carry from the registers 434, 435. A 40 bit adder 423 and saturation logic 424 complete the accumulate operation carried out in the accumulate stage 420.

Figure 5:
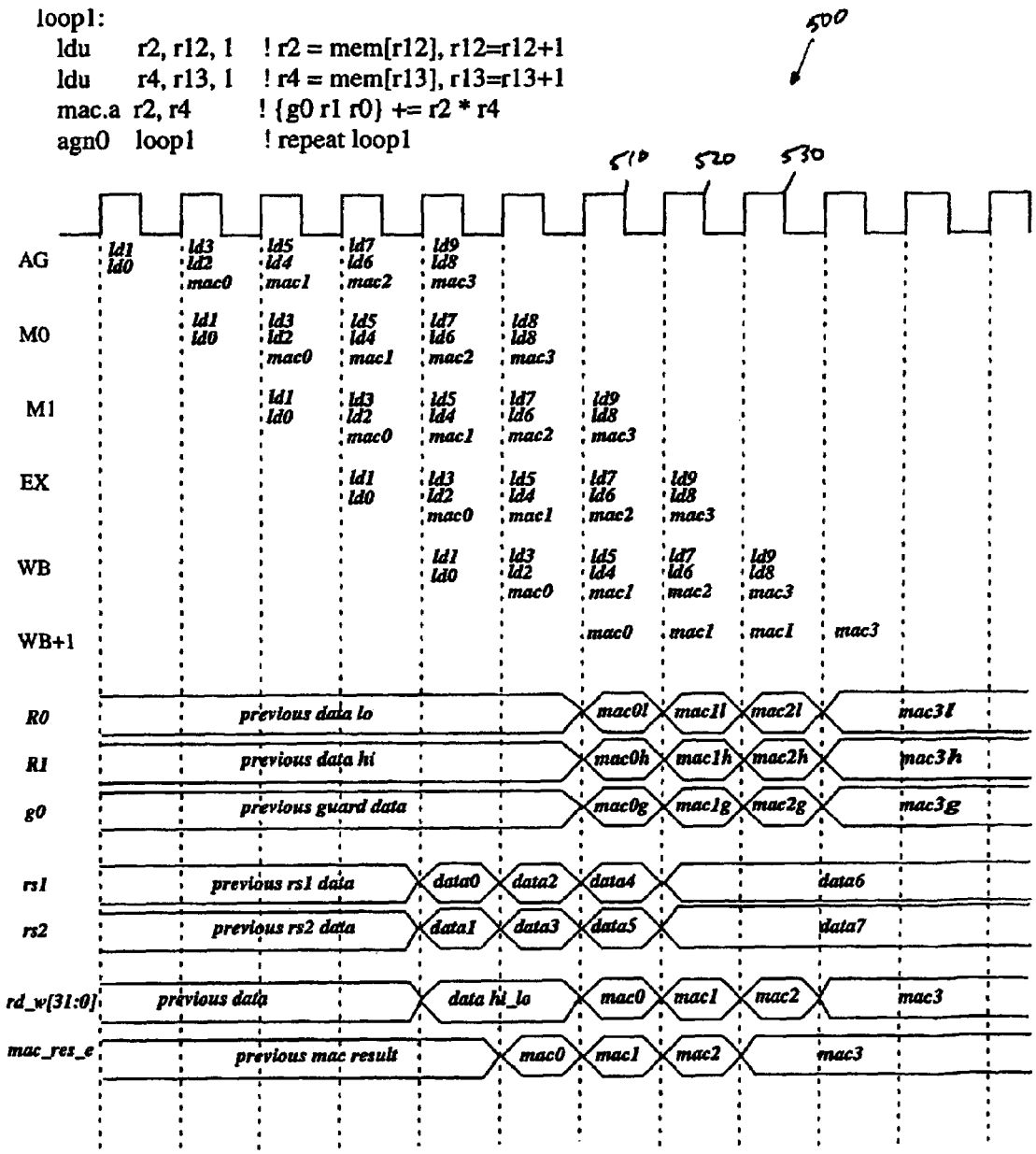
FIG. 5 illustrates a timing diagram showing the operation of the MAC of FIG. 4.

Turning now to FIG. 5, illustrated is a timing diagram, generally designated 500, showing the operation of the MAC 310 of FIG. 4. Operation of the MAC 310 with respect to an exemplary "tight loop" (defined above) is particularly illustrated. The exemplary tight loop is as set forth in Table 3, below:

TABLE 3

| Exemplary Tight Loop | | |
|---|---|---|
| loop1: | | |
| ldu | r2, r12, 1 | !r2=mem[r12], r12=r12+1 |
| ldu | r4, r13, 1 | !r4=mem[r13], r13=r13+1 |
| mac.a | r2, r4 | !{g0 R1 R0} +=r2*r4 |
| agn0 | loop1 | !repeat loop1 |

It can be readily seen from an examination of FIG. 5 that three complete results emerge from the MAC 310 in the three clock cycles 510, 520, 530.

Figure 6:
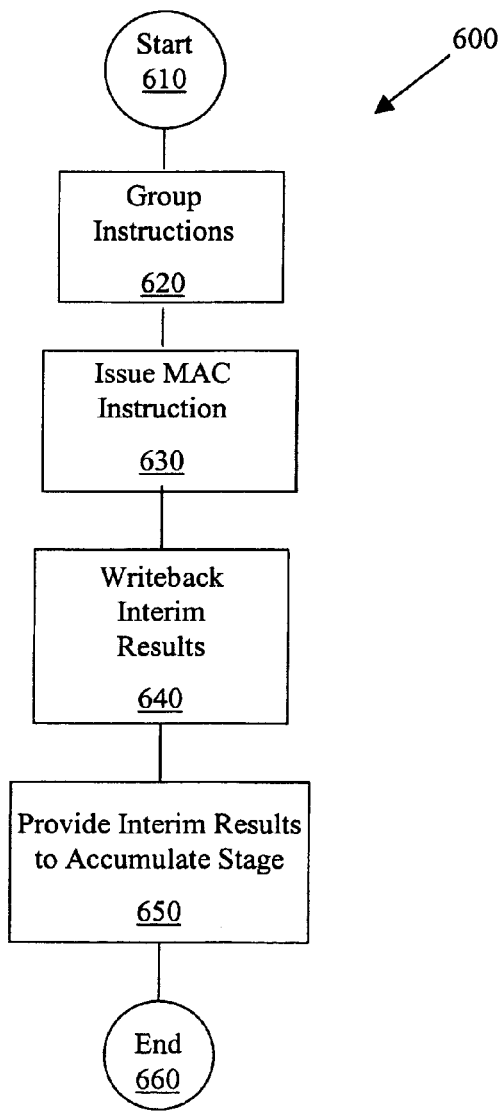
FIG. 6 illustrates a method of pipeline processing multiply-accumulate instructions with out-of-order completion carried out according to the principles of the present invention.

Turning now to FIG. 6, illustrated is a method, generally designated 600, of pipeline processing multiply-accumulate instructions with out-of-order completion carried out according to the principles of the present invention. The method 600 begins in a start step 610, wherein the DSP 100 encounters a MAC instruction that requires execution.

In a step 620, the MAC instruction is grouped with other instructions according to the grouping rules embodied in hardware within the instruction grouping logic 263 of isu_group 260 of FIG. 2 (including those grouping rules attributable to the pipelining of the MAC 310.

Next, in a step 630, the MAC instruction is issued to the multiply stage (410 of FIG. 4) of the MAC 310 as it becomes available. The multiply stage 410 executes the MAC instruction and generates interim results. Assuming that the accumulate stage (420 of FIG. 4) is unavailable, and therefore has not been allocated to further execution of the MAC instruction, the interim results are registered within the MAC 310. The interim results remain registered until the accumulate stage 420 becomes available and is allocated to the MAC instruction to complete its execution. In the meantime, the out-of-order completion logic 320 allows the MAC instruction to complete in the accumulate stage of the MAC 310 and allows younger instructions in the same group to complete in the multiply stage of the MAC 310.

When the accumulate stage 420 becomes available and is allocated for execution of the MAC instruction, the interim results are provided to the accumulate stage 420 in a step 650. The method 600 then ends in an end step 660.

Although the present invention has been described in detail, those skilled in the art should understand that they can make various changes, substitutions and alterations herein without departing from the spirit and scope of the invention in its broadest form.

What is claimed is:

1. For use in a processor having an at least four-wide instruction issue architecture, a mechanism for pipeline processing multiply-accumulate instructions with out-of-order completion, comprising:

instruction grouping logic implementing instruction grouping rules;

a multiply-accumulate unit (MAC) having an initial multiply stage and a subsequent accumulate stage; and out-of-order completion logic, associated with said MAC, that causes interim results produced by said multiply stage to be stored when said accumulate stage is unavailable and allows younger instructions to complete before said multiply-accumulate instructions, said multiply-accumulate instructions being grouped based on said rules, wherein said rules comprise:

a rule of never grouping an instruction that depends on a result of an older instruction, with the following exceptions:
  except wherein said instruction is a younger instruction and is a store or push operation, and wherein said older instruction is not a MAC instruction, or
  except wherein said younger instruction is a multiply accumulate operation and said older instruction updates said accumulate stage.

2. The mechanism as recited in claim 1 wherein said initial multiply stage and said subsequent accumulate stage are single clock cycle stages.

3. The mechanism as recited in claim 1 wherein said out-of-order completion logic is contained in a writeback stage of a pipeline in said processor.

4. The mechanism as recited in claim 1 wherein said out-of-order completion logic writes back said interim results to at least one register in said MAC before said multiply-accumulate instructions arrive at said accumulation stage of said MAC.

5. The mechanism as recited in claim 1 wherein said interim results are unavailable to an external program executing in said processor.

6. The mechanism as recited in claim 1 wherein said processor is a digital signal processor.

7. For use in a processor having an at least four-wide instruction issue architecture, a method of pipeline processing multiply-accumulate instructions with out-of-order completion, comprising:
  providing a multiply-accumulate unit (MAC) having an initial multiply stage and a subsequent accumulate stage;
  causing interim results produced by said multiply stage to be stored when said accumulate stage is unavailable; and
  completing younger instructions before said multiply-accumulate instructions, said multiply-accumulate instructions being grouped according to grouping rules based on said causing and said allowing, wherein said rules comprise:
    a rule of never grouping an instruction that depends on a result of an older instruction, with the following exceptions:
      except wherein said instruction is a younger instruction and is a store or push operation, and wherein said older instruction is not a MAC instruction, or
      except wherein said younger instruction is a multiply accumulate operation and said older instruction updates said accumulate stage.

8. The method as recited in claim 7 wherein said initial multiply stage and said subsequent accumulate stage are single clock cycle stages.

9. The method as recited in claim 7 wherein said causing is carried out in a writeback stage of a pipeline in said processor.

10. The method as recited in claim 7 wherein said causing comprises writing back said interim results to at least one register in said MAC before said multiply-accumulate instructions arrive at said accumulation stage of said MAC.

11. The method as recited in claim 7 wherein said interim results are unavailable to an external program executing in said processor.

12. The method as recited in claim 7 wherein said processor is a digital signal processor.

13. A digital signal processor (DSP), comprising:
  a pipeline having stages and capable of processing multiply-accumulate instructions;
  an instruction issue unit, containing grouping logic implementing instruction grouping rules, and at least four-wide instruction issue logic;
  a multiply-accumulate unit (MAC), coupled to said instruction issue logic, having an initial multiply stage and a subsequent accumulate stage; and
  out-of-order completion logic, associated with said pipeline, that causes interim results produced by said multiply stage to be stored when said accumulate stage is unavailable and allows younger instructions to complete before said multiply-accumulate instructions, said multiply-accumulate instructions being grouped according to said rules wherein said rules comprise:
    a rule of never grouping an instruction that depends on a result of an older instruction, with the following exceptions:
      except wherein said instruction is a younger instruction and is a store or push operation, and wherein said older instruction is not a MAC instruction, or
      except wherein said younger instruction is a multiply accumulate operation and said older instruction updates said accumulate stage.

14. The DSP as recited in claim 13 wherein said initial multiply stage and said subsequent accumulate stage are single clock cycle stages.

15. The DSP as recited in claim 13 wherein said out-of-order completion logic is contained in a writeback stage of said pipeline.

16. The DSP as recited in claim 13 wherein said out-of-order completion logic writes back said interim results to at least one register in said MAC before said multiply-accumulate instructions arrive at said accumulation stage of said MAC.

17. The DSP as recited in claim 13 wherein said interim results are unavailable to an external program executing in said DSP.

* * * * *